(No Model.)
J. A. BRILL.
TUG HOOK.
No. 376,810. Patented Jan. 24, 1888.
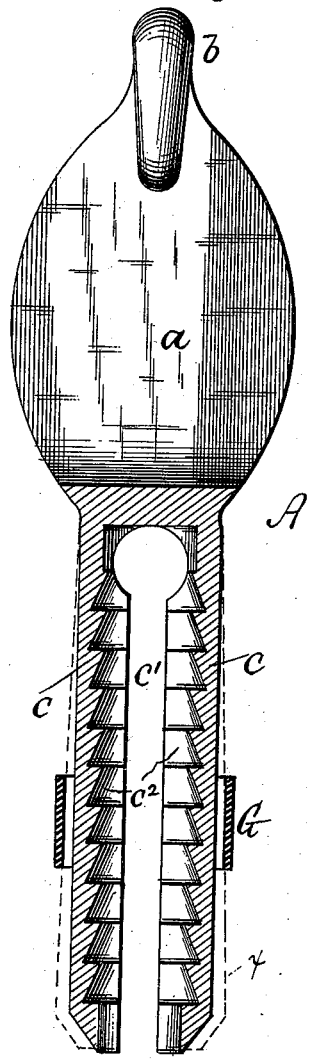
Fig. 1
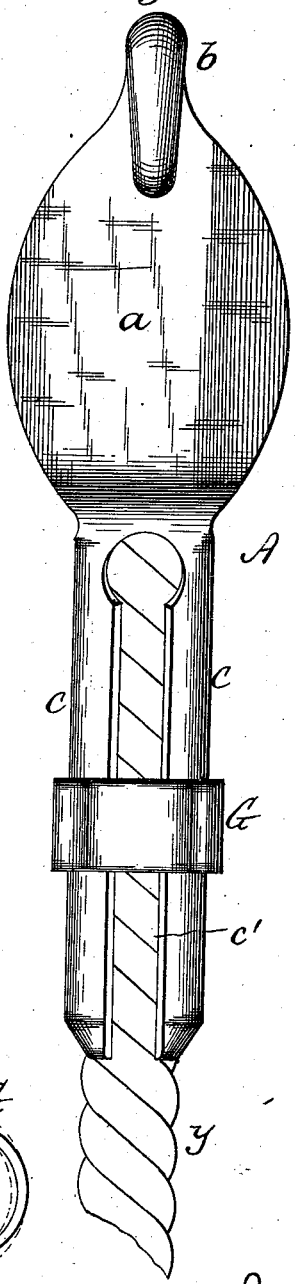
Fig. 2
Fig. 4
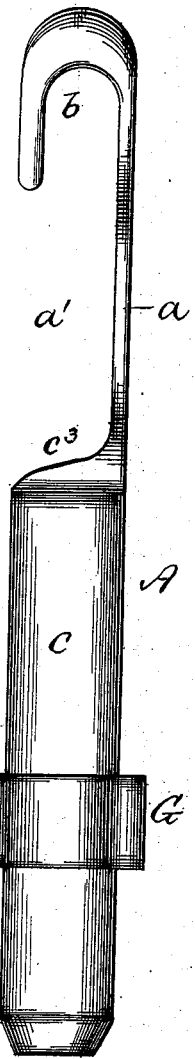
Fig. 3
WITNESSES:
INVENTOR
John A. Brill
By S. J. Van Stavoren
ATTORNEY

UNITED STATES PATENT OFFICE.

JOHN A. BRILL, OF PHILADELPHIA, PENNSYLVANIA.

TUG-HOOK.

SPECIFICATION forming part of Letters Patent No. 376,810, dated January 24, 1888.

Application filed September 20, 1887. Serial No. 250,211. (No model.)

*To all whom it may concern:*

Be it known that I, JOHN A. BRILL, a citizen of the United States, residing at Philadelphia, in the county of Philadelphia and State of Pennsylvania, have invented certain new and useful Improvements in Clutch or Clamp Tugs, of which the following is a specification.

My invention has relation to clutch or clamping tugs for ropes, traces, or other articles; and it has for its object to provide an inexpensive, durable, and strong clutch or clamp tug which can be easily and quickly coupled to and uncoupled from the rope.

My invention accordingly consists of the combination, construction, and arrangement of parts, as hereinafter described and claimed, reference being had to the accompanying drawings, wherein—

Figure 1 represents a sectional elevation of a tug embodying my improvements; Fig. 2, an elevation of same, showing a rope clutched or clamped thereto; Fig. 3, an elevation of Fig. 1 from another point of view, and Fig. 4 an end view of preferable form of sliding sleeve for the clutch or clamping jaws of the tug.

A represents a tug composed of a middle plate, $a$, having at one end a hook, $b$, and at the other end two semi-tubular elongated jaws or clamps, $c\ c$, all of which are integral. The plate $a$ is preferably a flat thin plate, having an oval outline in width, as shown, and is so arranged relatively to the hook and clamps that it aligns with the base of the hook and one side of the clamps, or, in other words, the hook and clamps project laterally from one side only of plate $a$, as shown more plainly in Fig. 3, to give the necessary space $a'$ between the rear end of the clamps $c\ c$ and the hook $b$, to admit of coupling the hook to and uncoupling it from a fixture, and also to avoid corners or projecting angles on both sides of plate $a$.

The clamps $c\ c$ are rendered flexible or slightly elastic by forming the oppositely-located slots $c'$ between them.

The bore of the clamps $c\ c$ is serrated or otherwise roughened or formed into transverse ridges $c^2$. Normally these clamps $c\ c$ diverge from one another from their base or connection $c^3$ with plate $a$, as indicated by dotted lines $x$, Fig. 1, and are drawn together by an exterior sliding sleeve, G, thereon. This sleeve is preferably segmentally or polygonally made, as indicated by full lines, Fig. 4, so that its inner corners, $g$, only contact with the clamps; but, if desired, it may be regular in outline, as shown by dotted lines in said figure. By sliding the sleeve G in the proper direction on the clamps or jaws $c\ c$ they are either opened for the reception of a rope, trace, other like article, (indicated at $y$, Fig. 2,) or are closed to effectually clamp the rope.

The tug is made of malleable iron or other suitable metal, and the hook $b$, plate $a$, and the semi-tubular parallel clamps $c\ c$ are all integral, so that they require no finishing, and all joints, pivots, and like fixtures are dispensed with.

What I claim is—

A tug, A, composed of central plate, $a$, having at one end an integral hook, $b$, and integral flexible semi-tubular clamping-jaws $c\ c$, serrated as at $c^2$, and an exterior sliding sleeve, G, substantially as set forth.

In testimony whereof I affix my signature in presence of two witnesses.

JOHN A. BRILL.

Witnesses:
S. J. VAN STAVOREN,
TH. RANDALL.